(12) United States Patent
Sandstrom et al.

(10) Patent No.: US 7,369,962 B2
(45) Date of Patent: May 6, 2008

(54) METHOD AND DEVICE FOR DATA INTEGRITY CHECKING

(75) Inventors: Torbjorn Sandstrom, Pixbo (SE); Leif Odselius, Taby (SE); Martin Olsson, Linkoping (SE)

(73) Assignee: Micronic Laser Systems AB, Taby (SE)

( * ) Notice: Subject to any disclaimer, the term of this patent is extended or adjusted under 35 U.S.C. 154(b) by 51 days.

(21) Appl. No.: 11/030,728

(22) Filed: Jan. 6, 2005

(65) Prior Publication Data

US 2005/0177326 A1   Aug. 11, 2005

Related U.S. Application Data

(60) Provisional application No. 60/535,106, filed on Jan. 8, 2004.

(51) Int. Cl.
*G06F 11/00* (2006.01)

(52) U.S. Cl. .................................... 702/183

(58) Field of Classification Search ............ 702/57, 702/60, 64, 79, 91, 93, 94, 104, 150, 176–178, 702/183, 189, 193; 369/103; 359/22, 298, 359/237, 290, 291
See application file for complete search history.

(56) References Cited

U.S. PATENT DOCUMENTS

| 4,547,882 | A | | 10/1985 | Tanner |
| 5,691,780 | A | * | 11/1997 | Marshall et al. ............ 348/743 |
| 5,959,747 | A | * | 9/1999 | Psaltis et al. .................. 359/22 |
| 6,014,128 | A | * | 1/2000 | Doherty et al. ............. 345/589 |
| 6,151,074 | A | * | 11/2000 | Werner ...................... 348/425.1 |
| 6,580,490 | B1 | * | 6/2003 | Wong et al. .................. 355/40 |
| 6,618,185 | B2 | | 9/2003 | Sandstrom et al. |
| 6,697,316 | B2 | * | 2/2004 | Burr .......................... 369/103 |
| 6,958,850 | B2 | * | 10/2005 | Sane et al. .................. 359/298 |

OTHER PUBLICATIONS

International Search Report of International Application No. PCT/SE 2005/000002, mailed Jul. 7, 20005.

* cited by examiner

*Primary Examiner*—Edward Raymond
*Assistant Examiner*—Mohamed Charioui
(74) *Attorney, Agent, or Firm*—Ernest J. Beffel, Jr.; Haynes Beffel & Wolfeld, LLP

(57) ABSTRACT

The present invention relates to high speed datapaths, sometimes including mixed digital and analog voltage signals. In particular, it relates to error checking strategies for large data volumes, in digital and/or analog domains and to analog signal patterns that accelerate charge loading of micromirrors in an SLM. Particular aspects of the present invention are described in the claims, specification and drawings.

19 Claims, 7 Drawing Sheets

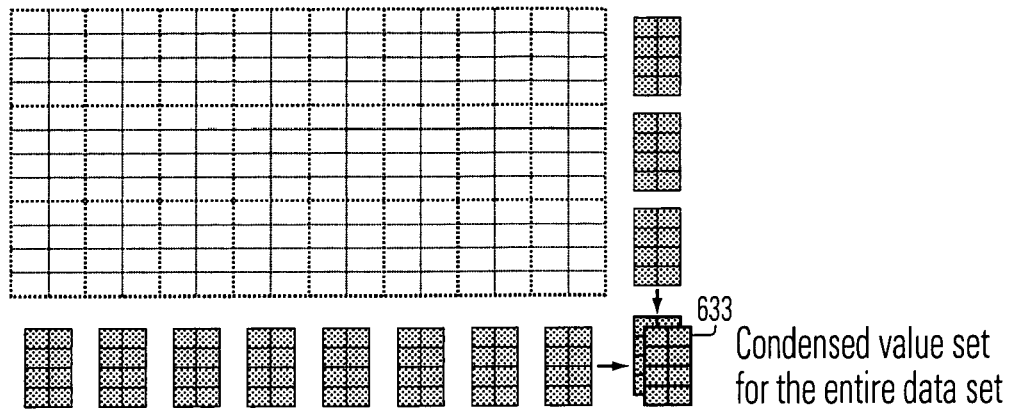
FIG. 6
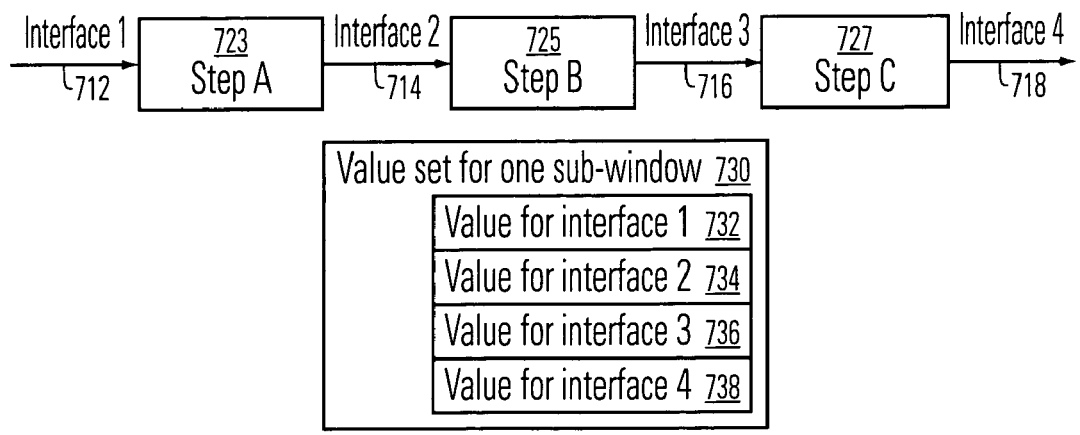
FIG. 7
| Value set for one sub-window | |
|---|---|
| CRC, interface 1 | Linear sum, interface 1 |
| CRC, interface 2 | Linear sum, interface 2 |
| CRC, interface 3 | Linear sum, interface 3 |
| CRC, interface 4 | Linear sum, interface 4 |
FIG. 8

METHOD AND DEVICE FOR DATA INTEGRITY CHECKING

RELATED APPLICATION

This application is related to and claims the benefit commonly assigned of U.S. Provisional Patent Application Ser. No. 60/535,106, entitled "Method and Device for Data Integrity Checking", filed on Jan. 8, 2004, naming Torbjörn Sandström, Leif Odselius and Martin Olsson as inventors. The related application is incorporated by reference.

BACKGROUND OF THE INVENTION

The present invention relates to high speed datapaths, sometimes including mixed digital and analog voltage signals. In particular, it relates to error checking strategies for large data volumes, in digital and/or analog domains and to analog signal patterns that accelerate charge loading of micromirrors in an SLM.

A microlithographic direct writing system produces a very large data flow. Segments of the data path are not readily susceptible to error detection and correction, either because of the sheer data volume or because of the data format, such as an analogue output of a D/A converter. A direct writing system might include a positioning system for a workpiece, such as a wafer, on which a pattern is written. The writing begins with input pattern data that describes the pattern. A graphic data processing system with data storage and computing mechanisms converts transfer this data to a pattern exposure system that actually projects the image onto the workpiece. One direct writing system could be based on Micronic Laser System's SLM-based patterning platform for mask writing. An SLM is a spatial light modulator that includes a large array of small mirrors that are individually controlled by analog voltages output from D/A converters. A laser flash is relayed from the micromirror array to an image plane, where it exposes a pattern on the workpiece. When the flash is generated, the array of micromirrors is actuated in a state that represents an image element. The laser typically flashes at a rate of a few kilohertz. The number of micromirrors in an array is typically one to four million. The amount of data required to drive the micromirrors is very large and the required data transfer rate is very high.

It is difficult to preserve data reliability through the data-path to the exposure mechanism. Data reliability in this context means preserving data integrity so no pattern data information is lost or changed in a way that is not intended. The preservation of data integrity in the data path needs separate mechanisms applicable to digital data storage, digital data transfer, digital data manipulation, digital to analog data conversion and analog data transfer.

An opportunity arises to improve data reliability methods and mechanisms. Better, more trustworthy and reliable components and systems may result.

SUMMARY OF THE INVENTION

The present invention relates to high speed datapaths, sometimes including mixed digital and analog voltage signals. In particular, it relates to error checking strategies for large data volumes, in digital and/or analog domains and to analog signal patterns that accelerate charge loading of micromirrors in an SLM. Particular aspects of the present invention are described in the claims, specification and drawings.

BRIEF DESCRIPTION OF THE DRAWINGS

In FIG. 6, the linearity of condensations is exploited to compare condensations across rows and columns.

FIG. 7, depicts in a more complex processing system, including processing data within a sub-window in multiple steps, and recording condensed value representations at interfaces to the steps. In FIG. 8, this approach can be extended by using both of the linear and non-linear (e.g., CRC) condensations.

DETAILED DESCRIPTION

Figure 1:
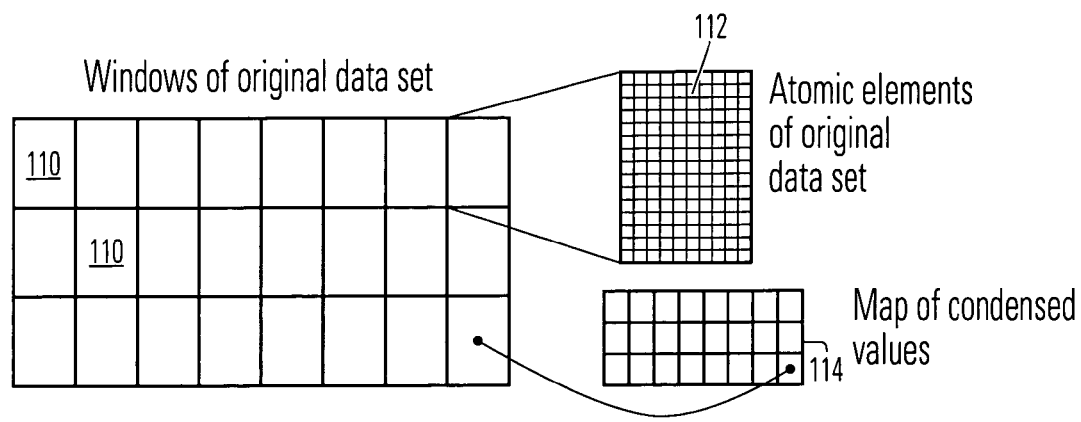
FIG. 1 illustrates subdivision of the data set into sections or windows.

The following detailed description is made with reference to the figures. Preferred embodiments are described to illustrate the present invention, not to limit its scope, which is defined by the claims. Those of ordinary skill in the art will recognize a variety of equivalent variations on the description that follows.

In an image processing system dealing with very large data volumes, the task of confirming reliability involves comparisons between different images and checking for discrepancies. Image processing systems in this context can be either based on image synthesis or image capture and analysis, or a combination.

A challenge found in a large-scale data set comparison is the ability to store and access the data that is to be compared. When data sizes exceed what is economical or practical to store on secondary storage media (such as hard-disk drives or tape) or when the requested rate of comparison exceeds what such devices exercise, the task of comparison between data sets become difficult. A byte-per-byte or block-per-block comparison would require fast access of all information to be compared. Many computation systems do not store calculation results for future use and the results only exist in an intermediate representation in data streams or volatile memory buffers. With the technology level of today (year 2003), data sets of multiple terabytes and access rates of multiple gigabyte per second represent performance levels where economical comparison can be hard to achieve.

The images used for comparison in an image processing system can be a combination of "known-good" data sets, representing a reference, and "to-be-verified" data sets representing a data set whose integrity one wishes to confirm. It is possible to use data sets solely of the "to-be-verified" type and compare them with each other and indicate discrepancies without stating which one is "correct". It is also possible to use data sets of the "to-be-verified" in three or more instances and compare them with each other using a "majority decision" model. If two of the data sets match and a third set differs, a possible interpretation is that the third set is the one that is incorrect. It is important to note that the method so far is heavily dependent upon the definitions of what is "correct" and what is "incorrect".

The methods proposed here address data volume and processing rate difficulties by using means of condensing or compaction to replace the task of comparing the entire data set with the task of comparing condensed or compacted versions of the data set. The method of condensation offers means of confining differences in the data set to specific regions, in which a more though comparison can be made. This way it is possible to trace individual error in a very large data set down to the level where the discrepancy can be exactly pointed out, in a two step procedure first resulting in a coarse pointer and then in a second step in an exact position. Locating errors without necessarily trying to correct them in real time is a more manageable problem.

A data set comparison method, such as the one described later in this document, can be applied to a plurality of situations where the data integrity is to be confirmed. The following are examples of situations where an efficient data set comparison method is useful.

When the physical execution components of a computation system of unknown reliability is to be verified with respect to data fidelity and repeatability (repeatability meaning the ability to produce identical results for each execution).

This verification can be requested at different situations such as (a) after production and assembly of the components, (b) after installation or repair of the components, (c) at regular intervals to check for long-term, permanent degradation of the components, or (d) during each execution of the computation to check for short-term or intermediate degradation of the components. It also can be requested when the software components of a computation system is to be verified with respect to data fidelity and repeatability, such as (e) introduction of new software versions that does not alter the data transformations, (f) introduction of new software versions that only partially alter the data transformations, (g) introduction of new software versions that completely alter the data transformations, or (h) investigation of in-field problems where the integrity of the software installation itself is under investigation.

The comparison method is also useful in a support situation where one wants to reproduce a particular execution at a different site with a different or identical setup. The proposed concept of comparison can then be used to ensure that the execution is reproduced in an identical way.

The proposed method prefers linear summation of data values over CRC, for condensed data sets. CRC (Cyclic Redundancy Check) uses the international standard CRC-32 algorithm. See, IEC 8802;ANSI X3.66. CRC methods give a very low probability that a two different data sets would give identical condensed value, and is hence the most secure to use. When the condensed value of two data sets differs, one can tell very little about the location of the difference, because CRC-32 algorithm is non-linear, so a one-bit difference in the data set can alter many or all bits of the condensed value.

Linear summation of data values, where the condensed value is the sum of values in the data set, gives a fairly high probability that two different data sets will generate the same condensed value, and can hence not be used to correct errors in the data or even to detect occasional two-bit errors. Consider for example a situation where two subsequent data values are swapped; in this case the linear sum would remain constant. However, linear summations have other more beneficial and useful characteristics, which will be shown later.

Partitioning of the Data Sets into Sections or Windows

One aspect of handling large data flow reliability is subdivision of the data set into sections or windows, as illustrated in FIG. 1. If the entire data set for example represents a large image, the data set can be subdivided into windows 110 in both X and Y directions. Each window represents numerous atomic elements 112 of the original data set. Window division facilitates a decomposition of the condensed values, where one condensed value is associated with exactly one window 114. Instead of comparing the actual data sets, the comparison of two data sets is performed by comparing maps of condensed values. For elements of the condensed value map that differ, the underlying structure of atomic elements can be fully compared in order to exactly pinpoint the differences, at least in cases where no short term storage of data set occur and the comparison occurs after the actual data set has been discarded, if the discrepancy can repeated in a second execution.

Figure 2:
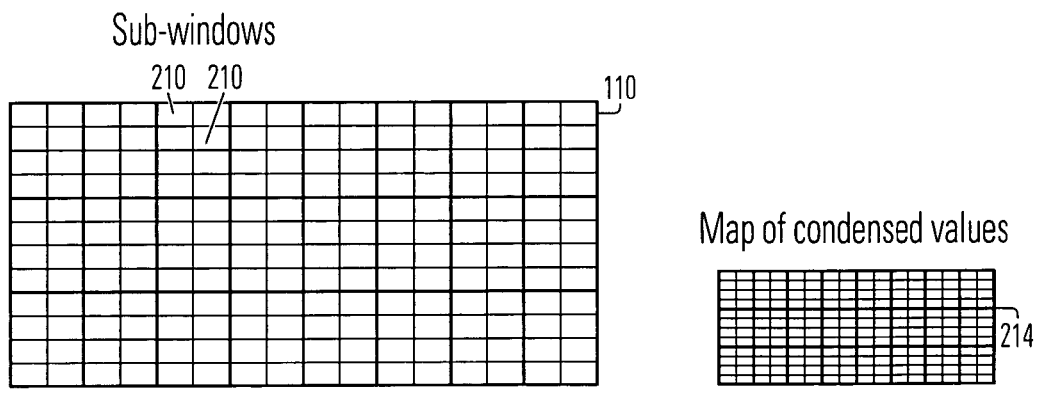
FIG. 2 depicts a hierarchy of sub-divisions of a data set into sections or windows.
Figure 3:
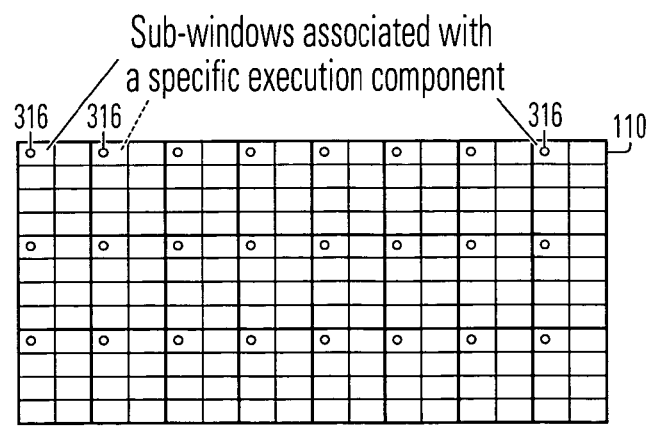
In FIG. 3, particular sub-windows are associated with particular execution components.

An extension of the concept of window division is shown in the FIG. 2, where a hierarchy of sub-divisions is introduced. Each window 110 at the higher level of hierarchy is in turn subdivided in both X and Y direction into sub-windows 210. Is in the previously described case, a map of condensed values 214 are associated with the data set, but now with one condensed value per sub-window. This sub-division is particularly useful when an execution is partitioned among execution components in such a way that one particular execution component is responsible for one sub-window position, as shown in FIG. 3. This way the part of the data set associated with a specific execution component 316 is covered by one dedicated condensed value, thus making it possible to pinpoint a potential discrepancy to a particular execution component.

Condensing the Condensed Values

Figure 4:
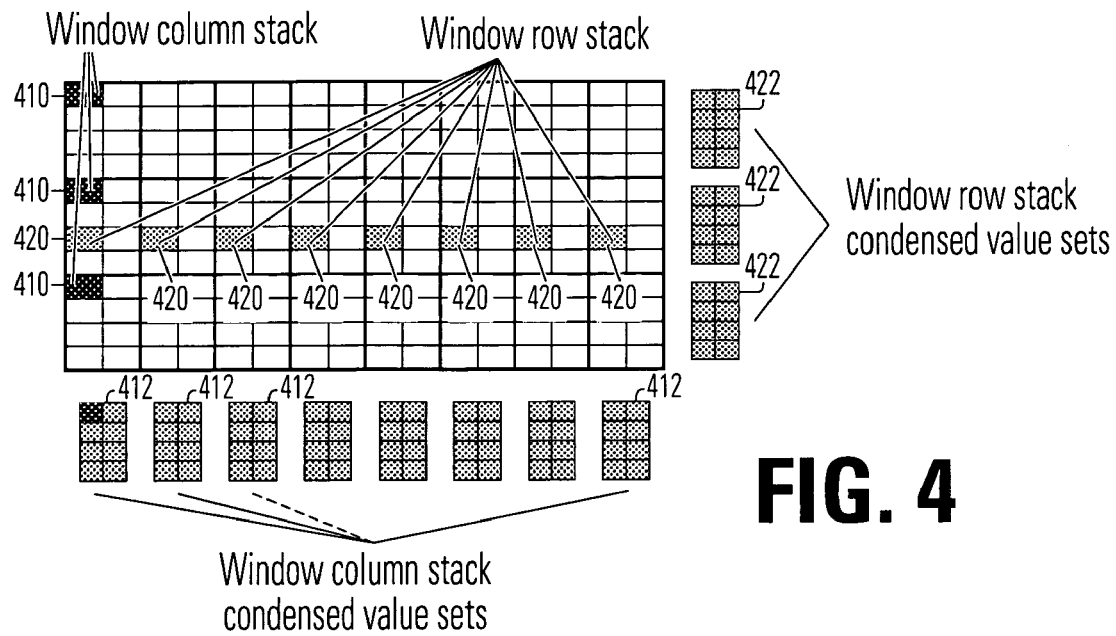
FIG. 4 illustrates accumulation of condensed values over rows and columns of sub-windows.

For very large data sets, the data sizes of condensed values in the map of sub-windows can grow relatively large. With a data set of 10 terabyte and for example 10.000 atomic data elements per sub-sub-window, the result is still 1 billion condensed value elements, which still can be difficult to efficiently transfer, access and compare. To resolve this without loosing too much of the precision in pinpointing individual discrepancies, the condensed values can be further condensed by performing an accumulation of condensed values over rows and columns of the sub-window mask, as illustrated in FIG. 4. In order not to loose the mapping of sub-sub-windows to execution components, two new abstractions are introduced: the Window Column Stack 410 and the Window Row Stack 420. These stacks are used to represent the aggregate condensation over rows and columns of the first hierarchical subdivision.

Figure 5:
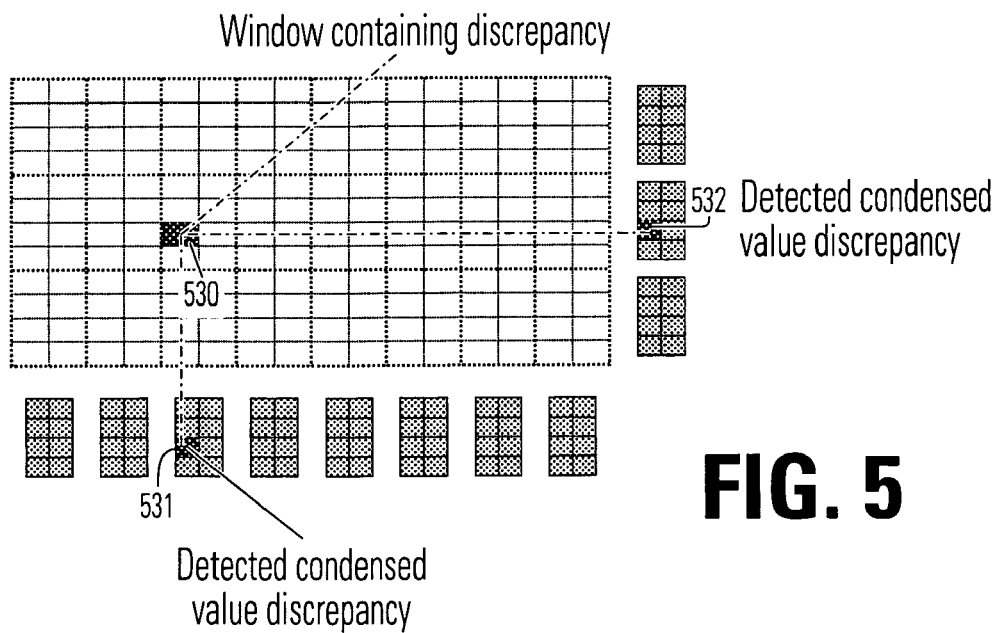
FIG. 5 shows how, in case of a discrepancy, these matrices accumulated over rows and columns can be used to locate an error.

By accumulating the condensed values of each Window Column Stack and each Window Row Stack, two new sets of matrices of condensed are created. One matrix set has a one matrix for each Window Column 412 and one matrix set has one matrix for each Window Row 422. FIG. 5 shows how, in case of a discrepancy, these matrices 531, 532 alone (without the full condensed value matrix for each window) are sufficient to pinpoint a single error 530. In case of larger counts of errors, ambiguities in the identification of the source of the discrepancy will arise, but still large areas of the data set can be excluded from further analysis.

FIG. 6 illustrates that by condensing the matrices of condensed values either for all rows or all columns, a new set of condensed values for the entire data set is derived 633. This very compact representation can be used for very quick comparisons, checking the entire data set, and still making it possible to associate discrepancies with an individual execution component. Note that the totals for linear summations will be identical for Window Row condensation and Window Column condensation, whereas the CRC-32 values, which are order dependent, will not be identical.

Monitoring Several Subsequent Processing Steps

Referring to FIG. 7, in a more complex processing system where the processing of data within a sub-window is partitioned into multiple steps 723, 725, 727, a set of aggregate condensed value representations can be used. This representation contains, for each sub-window 730, one condensed value 732, 734, 736, 738, for each processing step interface 712, 714, 716, 718. This approach can be extended by using both of the types of condensation mentioned before 802, 804, as illustrated in FIG. 8.

Using Linear Summation for Algorithm Verification

An interesting property is that the linear summation, especially when the data set represents a chain of samples or pixels, reflects upon the average or aggregate magnitude of the samples.

In context where a particular data set is decomposed into sub-sections or sub-windows this representation offers a method of testing results of both transformation algorithms and algorithms used for the partitioning of data into the sub-sections or sub-windows. If, for example, changing the parameterization of such partitioning operation does not alter the individual data set values, but alters the linear summations on each window, one can check that the overall sum of all linear summations does not change with the parameterization change.

Using Condensed Values for Comparison in Production Systems

The concept described above facilitates efficient comparison with modest bandwidth and storage requirements. In a production system, the concept can be used to monitor the integrity of the data processing in near real-time. Four system configurations facilitating full or partial check of integrity are suggested here: 1) Ghost System; 2) Ghost Channels; 3) Using spare time between jobs; or 4) Using spare time during jobs.

Ghost System

Figure 9:
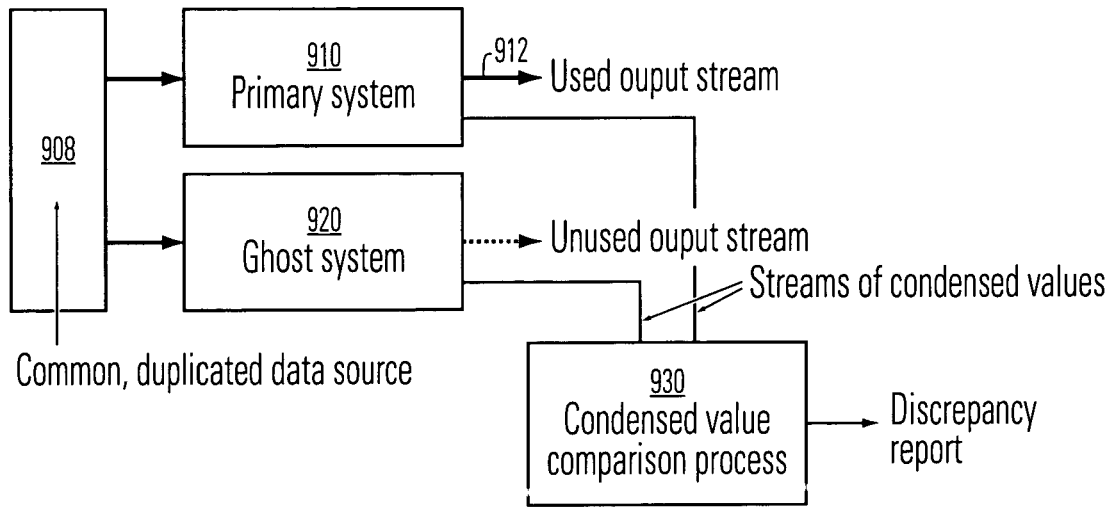
FIGS. 9-13 depict alternative configurations facilitating full or partial check of integrity, including a Ghost System (FIG. 9), Ghost Channels (FIG. 10), and using spare time between or during jobs (FIGS. 11-13).

This configuration, schematically illustrated in FIG. 9, involves a complete duplication of the entire system. Both system instances 910, 920 are fed with identical input data 908, but only one system is used as actual output 912.

The actual comparison is performed by a comparison process 930, separate from the processes that perform the processing. This process collects the condensed value data streams from both systems and matches them. The comparison process can execute on either a third, separate system, or on one of the compared systems. If the system latencies are short, the discrepancy report could potentially be used to initiate a system "retry" operation.

Ghost Channels

Figure 10:
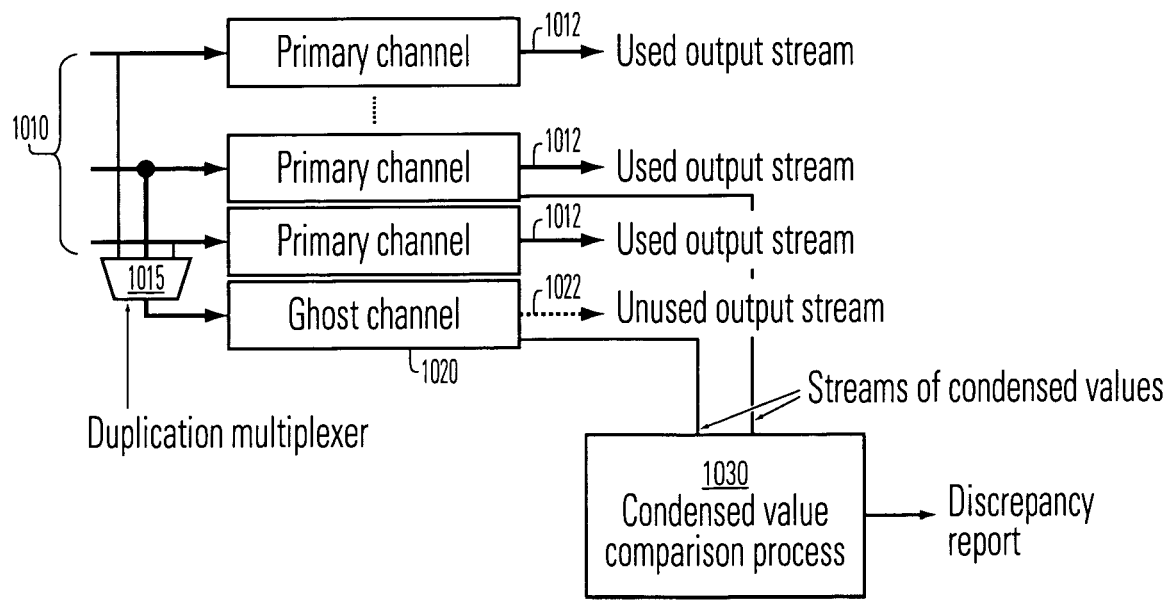

This configuration, schematically illustrated in FIG. 10, uses one or more extra execution components 1020 in order to duplicate the processing of one particular data path 1010. Multiple output streams 1012 from the multiple data paths 1010 are used, while one channel is duplicated 1022. The selection of which paths to duplicate can be altered dynamically using a multiplexer 1015 or similar component. The rationale behind this method is that a short- or long-term degradation can be allowed to exist for a shorter period of time but will eventually be detected when the path is checked. For example, if a single event upset degrades one particular path, the output will contain errors. This situation will be detected after a while, and the result can be discarded. This method can be used to monitor both single event degradations as well as unstable execution units.

Using Spare Time Between Jobs

Figure 11:
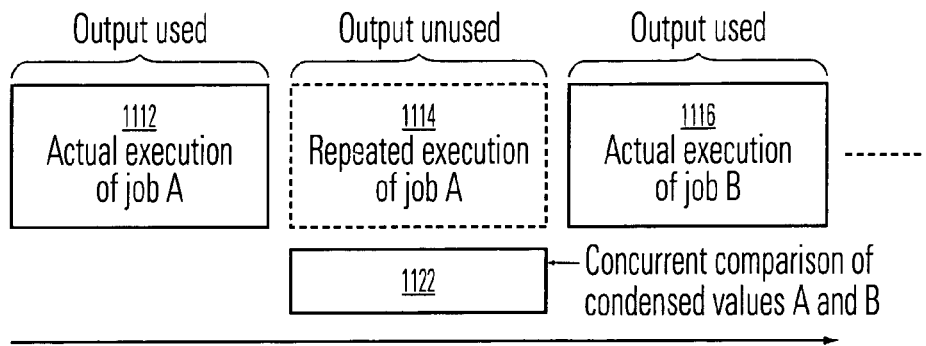

This configuration, schematically illustrated in FIG. 11, utilizes spare time 1114 between or during executions 1112, 1116 to run a redundant job with identical data between the actual jobs. The condensed value output stream of the first job can then be compared with the condensed value output stream of the second 1122 as the second stream is generated. In order to avoid execution of identical tasks with identical data on one specific execution unit, the input data stream can switched between the execution units to ensure that a defect unit will not be hidden by allowing it to re-generate identical but erroneous data.

Figure 12:
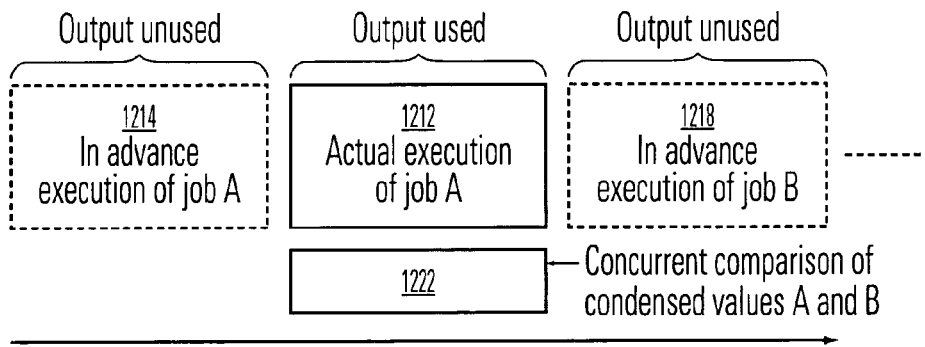

Depicted in FIG. 12, as an alternative to repeating the job after the actual processing, an execution used for reference 1214, 1218 can be generated in advance of the actual job 1212. This would facilitate the potential to interrupt the actual job directly upon detection of a discrepancy.

Using Spare Time During Jobs

Figure 13:
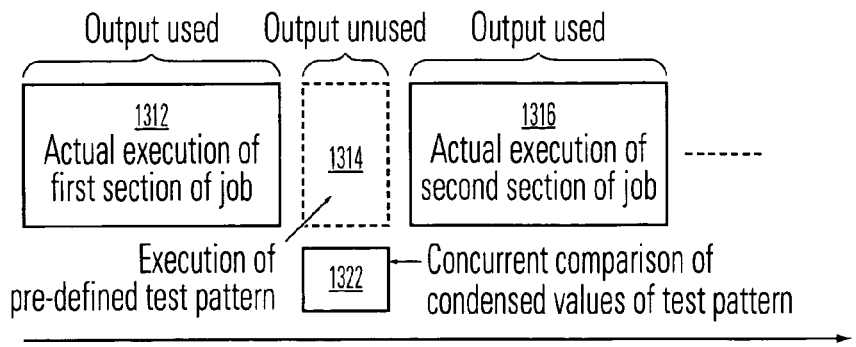

Depicted in FIG. 13, as more economical alternative or complement to the above method, a job can be interspersed with short test-runs, executed between sections of the actual jobs. These test-runs are based on pre-defined test patterns, designed to give high test-coverage. As an extension of the above method, the test patterns runs can be replaced with fractions of the actual execution data sets.

Analog Data Integrity Verification

Data verification is substantially complicated when digital data is converted into an analog signal. Some additional terminology will help in understanding verification of analog signals used to drive micromirrors. The term static data integrity verification is used here to refer to data integrity when data is stored or transferred over a data link. A well-known method to verify static data integrity is the addition of redundant data, which is verified at the point where data is used. This redundant data can for example be data parity or cyclic redundancy check (CRC) or various types of checksums.

The term dynamic data integrity verification is used here to refer to data integrity when the data is manipulated, i.e. when data is changed by a computing element as required in graphic image processing. This can be done by addition of redundant computing elements, making simultaneous computations on the same data and comparing the results after each step. This approach has however disadvantages in that it requires much additional hardware, that it is difficult to analyze where computation malfunctions and to compare computations from one time to another.

Figure 14:
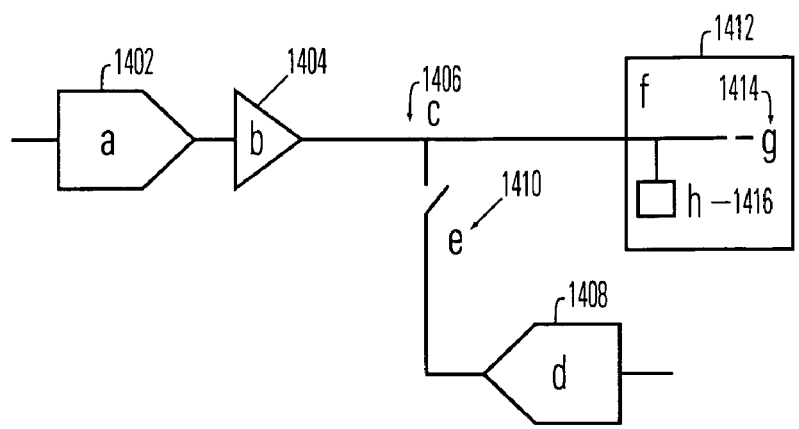
FIG. 14 illustrates verifying the signal response at a point somewhere along the analog signal line.

Analog data integrity cannot be verified by addition of redundant data in a practical manner. A more practical method to get adequate verification of analog data transmission is to periodically verify the integrity of the data interconnect system and separately verify the signal response at a point somewhere along the analog signal line and as a last step verify the physical response from the analog signal. This is illustrated in FIG. 14.

Assume that the analog source is a digital to analog converter 1402 with a buffer amplifier 1404. The analog output is monitored by a measurement device connected to point 1406. This measurement device might be an analog to digital converter 1408 that is connected to one of several signal sources by select switches 1410. The signal is further transferred to the signal destination which might be an spatial light modulator chip 1412. Means for monitoring the signal 1416 is attached to the signal as close as possible to the signal destination 1414. If the signal destination is an integrated circuit, this monitoring should preferably be integrated inside the circuit. The means for monitoring the signal 1416 should have an output signal that is connected to a monitoring device, which can be used to determine if the analog signal is connected to the signal destination. This monitoring is typically done periodically when the analog signal can be set to a known state but other configurations that allow continues monitoring is possible. The means for monitoring the signal from 1416 can be shared by several analog and digital input signals.

Figure 15:
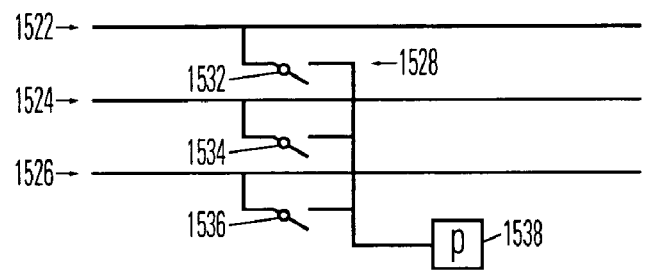
FIG. 15 shows a configuration wherein multiple inputs can be connected to signal rail via switches.

FIG. 15 shows a configuration where the inputs 1522, 1524, 1526 can be connected to signal rail 1528 via the switches 1523, 1534, 1536. The inputs can be set to a known state and the monitoring device 1538 can be connected to one input at the time and verify that the input signal has the intended signal level. The inputs can be a both analog and digital signals and the number of signals can be any number.

Figure 16:
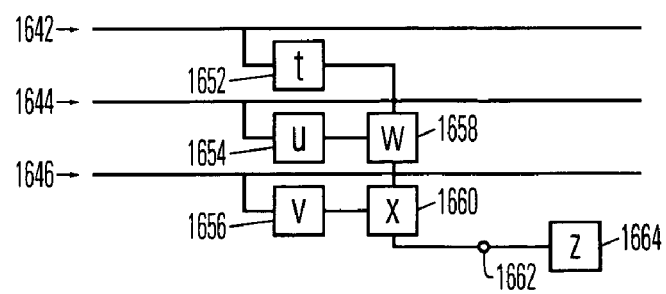
In FIG. 16, multiple input signals are connected to multiple detector devices.

Another arrangement is shown in FIG. 16. The input signals 1642, 1644, 1646 are connected to detector devices 1652, 1654, 1656 which have detection thresholds so it can detect if the signal is within known signal intervals. In one configuration, the detector devices are comparators that give a binary value when the signal is above a threshold and the opposite binary value when the input signal is below the threshold. The binary outputs from the detectors are connected via the exclusive or (XOR) gates 1658, 1660 to a common monitoring signal 1662 which is connected to the monitoring device 1664. When the interconnect integrity shall be tested, the inputs set initially set to known states with the each signal level within either of the two signal ranges which will cause the detectors to output either of the binary signal conditions. The binary signals are computed via the exclusive or gates to a resulting signal 1662. By changing only one of the input signals to the opposite signal range, the output signal should change to its opposite state. All inputs can be tested by changing one input at a time. The thresholds for the detection intervals can be individual for each input, so any number of signals and any combination of analog and digital inputs can be tested.

The exclusive or gates in FIG. 16 can be replaced by other logical operators, such as AND-gates, OR-gates or other logical operators. The minimum condition for testing all of a defined set of inputs is that there is one combination of input signal levels that gives a known output level, and that changing any input to a value within the opposite signal range will cause the output to change to its opposite value.

Method to Transfer Analog Data at a High Sampling Rate

Figure 17:
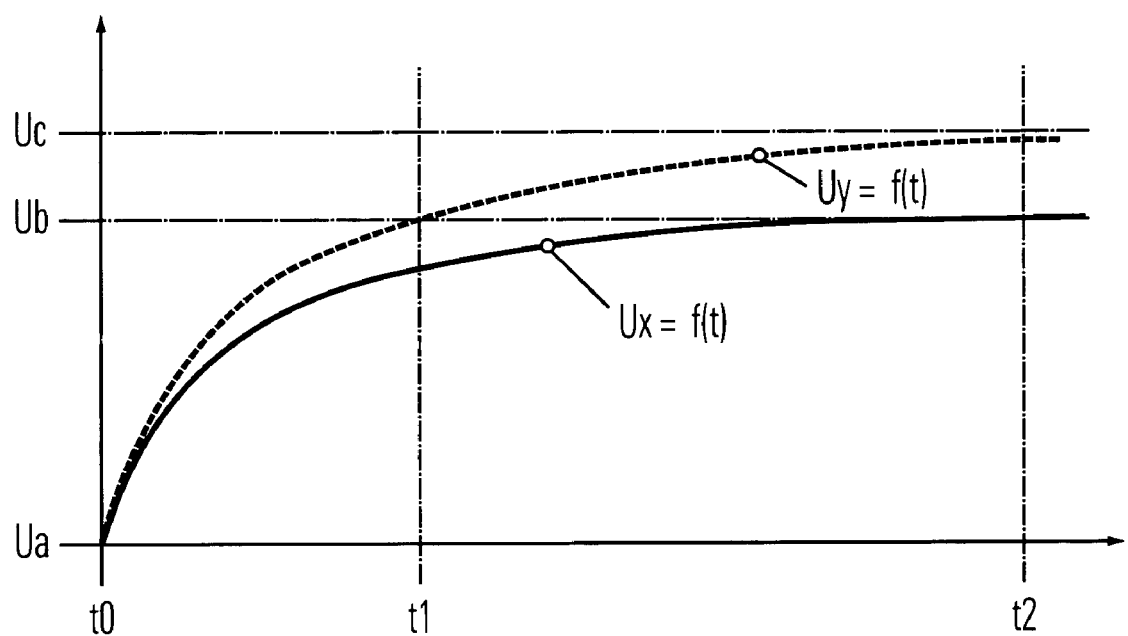
FIG. 17 shows a system where an analog signal shall be changed from level Ua to level Ub at time t0 and then be sampled at the times t1 or t2.

It is difficult to transfer analog data with a high speed via a sampled analog data link. FIG. 17 shows a system where an analog signal shall be changed from level Ua to level Ub at time t0 and then be sampled at the time t2. In a practical implementation, the signal source, the signal transmission line and the signal destination impedance will together cause a signal transient at the signal destination input that follows a time function $Ux=f(t)$. The time t2 required to reach the intended value Ub might exceed the requirements. One way to transfer the required voltage faster is to output the voltage Uc and then sample the voltage at time t1. Uc must then be selected in such a way that voltage has precisely reached voltage Ub at time t1. In the simplest system, the signal transient function is exponential. The voltage at time t1 is a fixed fraction of the final value at t>>t2. The fixed constant K is in the range between zero and one and is determined by the time constant of the exponential function. To transfer the analog value Ub to the destination at time t1 when the signal line has the initial value Ua, the output is changed from Ua to $Uc=Ua+(Ub-Ua)/K$. If the transfer function is not exponential, a corresponding compensation can still be made, but the compensation function is more complex. The voltage Uc can be calculate digitally as the signal transfer function and the voltages Ua and Ub are known before the data corresponding to voltage Uc is transferred to the DAC.

Some Particular Embodiments

The present invention may be practiced as a method or device adapted to practice the method. The methods can be viewed from the perspectives of digital or analog signals. Devices adapted to practice the claimed method are constructed from low level digital components that may be implemented in an FPGA, semi-custom ASIC or custom ASIC IC.

One embodiment is a method of detecting errors in a very high volume data stream to an SLM chip after generation of analog voltages to drive individual SLM elements. This method includes receiving one or more predicted diagnostic values that predict summary values for sets of analog voltages to be generated to drive the individual SLM elements. It further includes generating within the SLM chip one or more actual diagnostic values that summarize the sets of analog voltages being used to drive the individual SLM elements. It also includes comparing the predicted and actual diagnostic values and generating a signal corresponding to the comparison. The comparing may take place during or after generation of the actual diagnostic values. When it takes place during generation of the actual diagnostic values, it may operate on stored or pre-generated predicted diagnostic values. When stored actual diagnostic values are compared to predicted diagnostic values, the comparing may proceed during time slices within a job utilizing the SLM, when the SLM is not being used to generate patterns, or it may take place between jobs utilizing the SLM.

One aspect of this method is that the generating further includes switching among several sources of the analog voltages alternately coupled to a detector.

Another aspect of this method, applicable to any of the embodiments above, is that bi-level or multi-level detection may be applied to the analog voltages. Detection components may be calibrated using sample analog voltages to determine their actual response.

Any of the methods described above or aspects of the methods may be embodied in a device.

Another method embodiment is a method of detecting errors in a very high volume data stream using a summary value function. This method includes dividing the data stream into rows and columns of segments and calculating predicted diagnostic values that predict summary values for the rows and the columns of the segments. During operation of a data path that transmits the data stream to an SLM, this method includes calculating actual diagnostic values that summarize values for the rows and the columns of the segments. It further includes comparing the actual and predicted row and column summary diagnostic values and, in case of a discrepancy between the actual and predicted diagnostic values, identifying a segment causing the discrepancy from the row and column summary diagnostic value.

One aspect of this method is that the summary value function can be either a linear function or a nonlinear function. In the case of the linear summary value function, summing or repeatedly applying the linear summary value function across the row summary diagnostic values should equal summing or repeatedly applying the linear summary value function across the column summary diagnostic values and/or parts of the diagnostic values correspond to segments within the respective rows and columns. In the case of the nonlinear summary value function, summing or repeatedly applying the nonlinear summary value function across intermediate row summary diagnostic values should not equal summing or repeatedly applying the nonlinear summary value function across the column summary diagnostic values.

The aspects of the methods above, related to the timing or mechanics of comparing, may generally be combined with this method.

A further method embodiment is a method of high speed loading of charges that control numerous individual micromirrors of an SLM. This method includes selecting a particular voltage or charge level to control an orientation of an individual micromirror in the SLM and applying an analog voltage to a control line corresponding to the individual mirror, the analog voltage on the control line having a predetermined voltage or charge accumulation pattern that would exceed the selected particular voltage or charge level over an extended time. It further includes utilizing an accumulated voltage or charge at a predetermined time earlier than the extended time, the predetermined time being when the accumulated voltage or charge corresponds to the selected particular voltage to control orientation of the individual micromirror.

One aspect of this method further includes sampling the accumulated voltage on the control line at the predetermined time. An alternate aspect of this method includes accumulating a charge in a capacitor coupled to the control line and halting the charge accumulation at the predetermined time.

Any of the methods described above or aspects of the methods may be embodied in a device including logic and resources adapted to carry out the methods described.

While the present invention is disclosed by reference to the preferred embodiments and examples detailed above, it is understood that these examples are intended in an illustrative rather than in a limiting sense. It is contemplated that modifications and combinations will readily occur to those skilled in the art, which modifications and combinations will be within the spirit of the invention and the scope of the following claims.

We claim as follows:

1. A method of detecting errors in a very high volume data stream to an SLM chip after generation of analog voltages to drive individual SLM elements, including:
   receiving one or more predicted diagnostic values that predict summary values for sets of analog voltages to be generated to drive the individual SLM elements;
   generating within the SLM chip one or more actual diagnostic values that summarize the sets of analog voltages being used to drive the individual SLM elements;
   comparing the predicted and actual diagnostic values; and
   generating a signal corresponding to the comparison.

2. The method of claim 1, wherein the generating a signal action further includes bi-level detection of the analog voltages.

3. The method of claim 2, wherein bi-level detection components used for generating actual diagnostic values from the sets of analog voltages are calibrated to determine their actual response to sample analog voltages.

4. The method of claim 2, wherein multiple-level detection components used for generating actual diagnostic values from the sets of analog voltages are calibrated to determine their actual response to sample analog voltages.

5. The method of claim 1, wherein the comparing takes place as generation of the actual diagnostic values proceeds.

6. The method of claim 1, wherein the comparing operates on stored actual diagnostic values.

7. The method of claim 1, wherein the generating a signal action further includes switching among several sources of the analog voltages alternately coupled to a detector.

8. The method of claim 1, wherein the generating a signal action further includes multiple-level detection of the analog voltages.

9. A method of detecting errors in a very high volume data stream using a summary value function, including:
   dividing the data stream into rows and columns of segments;
   calculating predicted diagnostic values that predict summary values for the rows and the columns of the segments;
   during operation of a data path that transmits the data stream to an SLM, calculating actual diagnostic values that summarize values for the rows and the columns of the segments;
   comparing the actual and predicted row and column summary diagnostic values; and
   in case of a discrepancy between the actual and predicted diagnostic values, identifying and reporting a segment causing the discrepancy from the row and column summary diagnostic values.

10. The method of claim 9, wherein the comparing takes place as generation of the actual diagnostic values proceeds.

11. The method of claim 10, wherein the predicted diagnostic values are generated concurrently with the actual diagnostic values by a redundant component.

12. The method of claim 10, wherein the predicted diagnostic values are generated in advance of generating the actual diagnostic values.

13. The method of claim 9, wherein the predicted diagnostic values are produced by a linear summary value function, such that summing the row summary diagnostic values should equal summing the column summary diagnostic values.

14. The method of claim 9, wherein the predicted diagnostic values are produced by a linear summary value function, such that parts of the diagnostic values correspond to segments within the respective rows and columns.

15. The method of claim 9, wherein the predicted diagnostic values are produced by a nonlinear summary value function, such that summing the row summary diagnostic values should not equal summing the column summary diagnostic values.

16. The method of claim 9, wherein the comparing operates on stored actual diagnostic values, using time slices when the SLM chip is not being used to generate patterns.

17. A method of high speed loading of charges that control numerous individual micromirrors of an SLM, the method including:

selecting a particular voltage or charge level to control an orientation of an individual micromirror in the SLM;

applying an analog voltage to a control line corresponding to the individual mirror, the analog voltage on the control line having a predetermined voltage or charge accumulation pattern that would exceed the selected particular voltage or charge level over an extended time; and utilizing an accumulated voltage or charge at a predetermined time earlier than the extended time, the predetermined time being when the accumulated voltage or charge corresponds to the selected particular voltage to control orientation of the individual micromirror.

18. The method of claim 17, wherein utilizing further includes sampling the accumulated voltage on the control line at the predetermined time.

19. The method of claim 17, wherein utilizing further includes accumulating a charge in a capacitor coupled to the control line and halting the charge accumulation at the predetermined time.

* * * * *